(12) United States Patent
Couleaud et al.

(10) Patent No.: US 11,961,123 B1
(45) Date of Patent: Apr. 16, 2024

(54) MANAGING INVENTORY OF TARGETED ADVERTISEMENTS FOR IN-VEHICLE ENTERTAINMENT

(71) Applicant: Thales Avionics, Inc., Irvine, CA (US)

(72) Inventors: Jean-Yves Couleaud, Mission Viejo, CA (US); Peter Hong, Irvine, CA (US); Jerry Thomas, Mission Viejo, CA (US); Tracy Decuir, Yorba Linda, CA (US); Cecile Andre, Laguna Beach, CA (US)

(73) Assignee: THALES AVIONICS, INC., Irvine, CA (US)

( * ) Notice: Subject to any disclaimer, the term of this patent is extended or adjusted under 35 U.S.C. 154(b) by 239 days.

(21) Appl. No.: 16/378,672

(22) Filed: Apr. 9, 2019

Related U.S. Application Data

(60) Provisional application No. 62/654,930, filed on Apr. 9, 2018, provisional application No. 62/655,558, filed on Apr. 10, 2018.

(51) Int. Cl.
*G06Q 30/0251* (2023.01)
*G06Q 30/0272* (2023.01)

(52) U.S. Cl.
CPC ..... *G06Q 30/0265* (2013.01); *G06Q 30/0272* (2013.01)

(58) Field of Classification Search
CPC ....... G06Q 30/0207–30/0277; G06Q 30/0265; G06Q 30/0272
USPC ................. 705/14, 319, 14.56, 14.62, 14.43; 709/219; 725/77; 719/217
See application file for complete search history.

(56) References Cited

U.S. PATENT DOCUMENTS

| | | | | |
|---|---|---|---|---|
| 2004/0119589 | A1* | 6/2004 | French | G06Q 10/025 340/539.11 |
| 2010/0161408 | A1* | 6/2010 | Karson | G06Q 30/0244 705/14.43 |
| 2011/0270679 | A1* | 11/2011 | Tziortzis | H04W 4/027 705/14.62 |
| 2013/0031215 | A1* | 1/2013 | Macrae | H04L 65/80 709/219 |
| 2013/0238417 | A1* | 9/2013 | Frelk, Jr. | G06Q 30/0207 705/14.56 |

(Continued)

OTHER PUBLICATIONS

Chanju Mwanza, Spring into Action with Facebook's Dynamic Ads for Travel, 2017 (Year: 2017).*

*Primary Examiner* — Tarek Elchanti
(74) *Attorney, Agent, or Firm* — Sage Patent Group

(57) ABSTRACT

A system for managing advertisements in an in-flight entertainment ("IFE") system operating on an airplane can include an inventory processing device and a non-transitory computer readable medium. The non-transitory computer readable medium can be communicatively coupled to the inventory processing device to cause the inventory processing device to perform operations. The operations can include determining an inventory of targeted advertisements for future flights. The operations can further include receiving a request to use a portion of the inventory for advertisements associated with an advertiser. The operations can further include transmitting instructions to an IFE controller on-board the airplane to cause the IFE controller to provide the advertisements during targeted advertisement opportunities during a flight.

22 Claims, 11 Drawing Sheets

(56) References Cited

U.S. PATENT DOCUMENTS

2014/0297418 A1* 10/2014 Gaur ................. G06Q 30/0265
                                                        705/14.62
2015/0229973 A1*  8/2015 Cline ............... H04N 21/44209
                                                        725/77
2016/0292714 A1* 10/2016 Bhalgat ............. G06Q 30/0242

* cited by examiner

MANAGING INVENTORY OF TARGETED ADVERTISEMENTS FOR IN-VEHICLE ENTERTAINMENT

CROSS REFERENCE TO RELATED APPLICATIONS

This application claims priority to U.S. Prov. App. No. 62/654,930 filed Apr. 9, 2018 and U.S. Prov. App. No. 62/655,558 filed Apr. 10, 2018, the disclosure and content of which are incorporated by reference herein in their entirety.

TECHNICAL FIELD

Embodiments described herein relate generally to in-vehicle entertainment and, more particularly to managing an inventory of targeted advertisements for in-vehicle entertainment.

BACKGROUND

Advertisements provided during in-flight entertainment ("IFE") can be linked to the content (e.g., movie, tv shows, documentaries, or video game) being hosted by the IFE. Airlines can be paid by advertisers to embed an advertisement in the content. For example, some video advertisements may be shown on a display prior to displaying a movie or at specific times during the movie. Some airlines opt to display advertisements as soon as a passenger accesses the IFE to guarantee that all passengers using the IFE, even those not starting a video program, will be shown a few advertisements.

In an offline environment such as those aboard an airplane, content has to be loaded in on-board servers before it can be served to passengers on television screens installed at their seats or streamed to their personal devices (e.g., smartphones, laptops, or tablets). The content may be prepared and loaded onto the on-board server every thirty to sixty days. Since the advertisements may be linked with the content and the content may only be updated every thirty to sixty days, the advertisements may become less relevant prior to being updated. For example, an advertisement for a sporting event may still be advertised after the sporting event has been played.

SUMMARY

The following detailed description discloses various non-limiting example embodiments of the invention. The invention can be embodied in many different forms and is not to be construed as limited to the embodiments set forth herein.

Some embodiments herein describe a system for managing advertisements in an in-flight entertainment ("IFE") system operating on an airplane, the system. The system can include an inventory processing device and a non-transitory computer readable medium communicatively coupled to the inventory processing device to cause the inventory processing device to perform operations. The operations can include determining an inventory of targeted advertisements for a plurality of future flights. The operations can further include receiving a request to use a portion of the inventory for advertisements associated with an advertiser. The operations can further include transmitting instructions to an IFE controller on-board the airplane to cause the IFE controller to provide the advertisements during targeted advertisement opportunities during a flight.

Other embodiments herein describe a method for managing advertisements in an in-flight entertainment ("IFE") system operating on an airplane. The method can include determining an inventory of targeted advertisements for a plurality of future flights. The method can further include receiving a request to use a portion of the inventory for advertisements associated with an advertiser. The method can further include transmitting instructions to an IFE controller on-board the airplane to cause the IFE controller to provide the advertisements during targeted advertisement opportunities during a flight.

Other embodiments herein describe a system for managing advertisements in a video-on-demand ("VOD") system operating in a vehicle. The system can include an inventory processing device and a non-transitory computer readable medium communicatively coupled to the inventory processing device to cause the inventory processing device to perform operations. The operations can include determining an inventory of targeted advertisements for a plurality of future trips. The operations can further include receiving a request to use a portion of the inventory for advertisements associated with an advertiser. The operations can further include transmitting instructions to an VOD controller on-board the vehicle to cause the VOD controller to provide the advertisements during targeted advertisement opportunities during a trip.

BRIEF DESCRIPTION OF THE DRAWINGS

Other features of embodiments will be more readily understood from the following detailed description of specific embodiments thereof when read in conjunction with the accompanying drawings in which.

DETAILED DESCRIPTION

Figure 1:
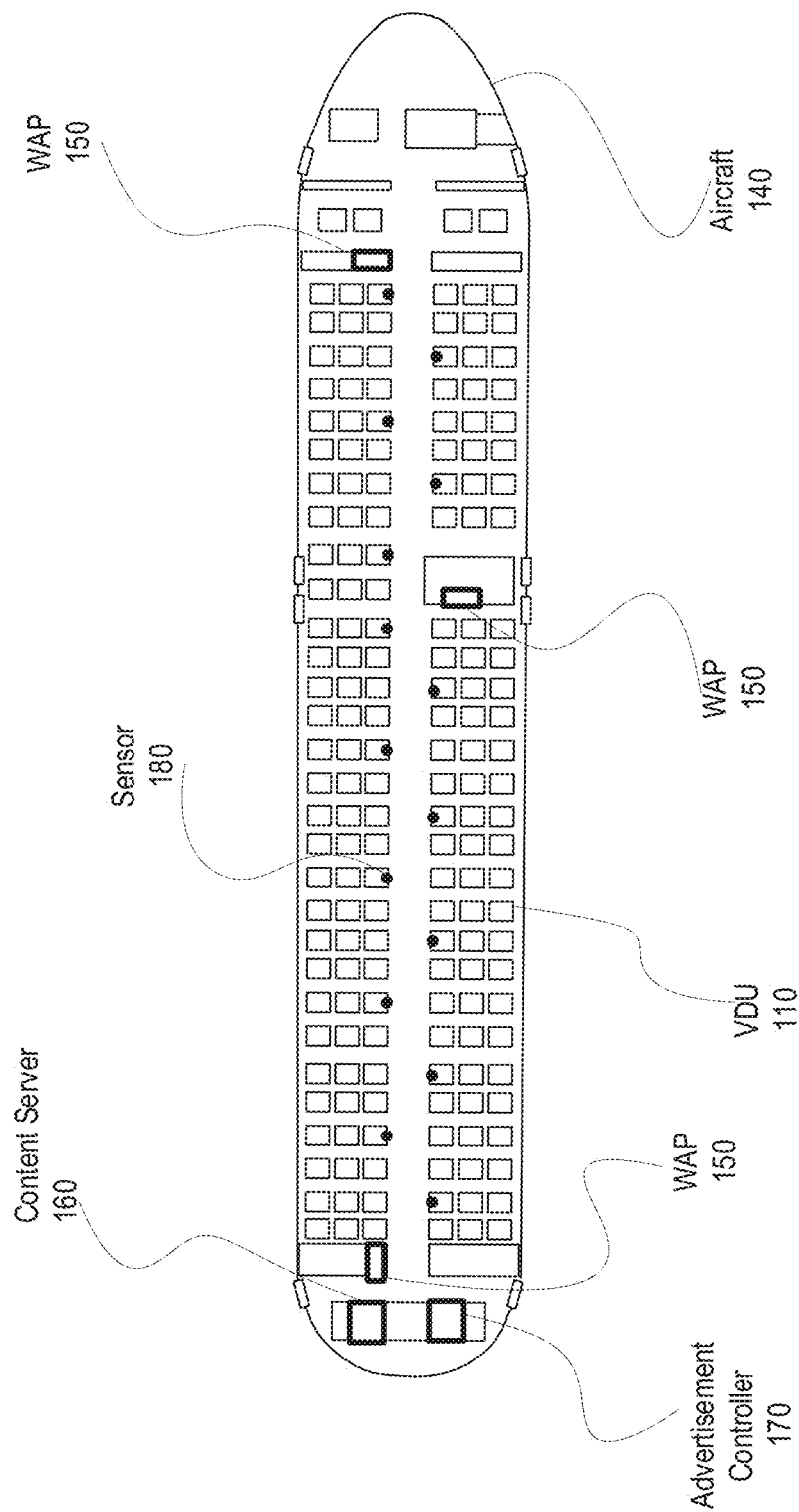
FIG. 1 is a schematic diagram that illustrates an example of an aircraft cabin with an advertisement controller processing device that manages advertisements provided during a flight according to some embodiments of the present disclosure.

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

In-flight entertainment ("IFE") systems can be deployed onboard aircraft to provide entertainment for passengers in a passenger cabin. In some examples, IFE systems provide passengers with television, movies, games, audio entertainment programming, and other electronic content. In some examples, a wireless IFE system can provide wireless entertainment connectivity to passenger electronic devices ("PEDs") for Internet access as well as streaming entertainment (e.g., movies). Advertisers may pay airlines to link advertisements to specific content displayed by the IFE such that the advertisement is shown when the specific content is selected by a passenger. Linking advertisements to content can allow for some targeting of advertisements. For example, if an advertiser wants to target males above 40, they may have a better chance to reach their target audience if their ad is played before a James Bond film than before Bridget Jones' Diary. However, advertisers are paying for a captive audience rather than actual impressions or views of an advertisement. As a result, the number of times an advertisement is shown can vary dramatically. In some examples, the advertisement may never be shown if it is attached to content that is never viewed. In other examples, there may be "impression waste" when an advertisement campaign runs for a whole duration of an IFE content cycle, even though an estimated number of impressions was reached before the end of the cycle. In this case, the airlines may be missing out extra revenue.

Various embodiments of the present disclosure are directed to a system and process for managing inventory of targeted advertisements for in-vehicle entertainment. Some examples of the vehicle include: an airplane, a train, a bus, or a boat. Some examples of in-vehicle entertainment include video-on-demand ("VOD") and IFE. These innovations can improve passenger experience by resulting in more personalized advertisements, improve airline advertisement revenue by allowing for the sale of impressions of targeted advertisements, and improve an effectiveness of advertisement campaigns.

Impressions are a common currency in the digital advertisement world. Advertisement contract can be negotiated in costs per Thousands of Impressions ("CPMs") and the cost can be based on how targeted the advertisements are to a desired consumer group.

In some embodiments, an inventory manager can manage an inventory of targeted advertisements in real time and provide advertisement instructions to an advertisement controller on-board a vehicle within one day of each trip. The inventory of targeted advertisements can refer to an amount of opportunities for an impression during a period of time in which to run an advertisement campaign. An inventory can be unique to a specific advertisement campaign. For example, if an airline flies 40% male and 60% female, the inventory for a campaign targeting males may be higher than one targeting females. In additional or alternative examples, an advertisement may be linked to a number of videos watched and if males watch significantly more videos than females then the inventory of males may be higher than the inventory of females.

Some embodiments use machine learning to estimate the inventory available at the time of an advertisement campaign is created by computing the number of expected impressions for an advertisement campaign. The number of expected impressions can be based on: the start date and end date of the campaign ("the period"); the flights scheduled during the period; the current confirmed passenger bookings on the flights scheduled for the period; the flights equipped with the targeting advertisement engine (e.g., airlines may a have diverse fleet and not all of them may be equipped with the same IFE); the inventory already booked for that period; and the historical impression count for all similar flights as those for the period. In some examples, similar flights may be flights with the same origin, destination, same period the year before (or the month before or the week before depending when the campaign is created). Machine learning may allow an inventory manager to estimate how accurate the historical data will be in predicting the future.

The inventory may be further affected by how advertisements are played on-board the vehicle. For example, one airline may decide to systematically play two advertisements per advertisement-break and limit the number of advertisement-breaks to 1 per hour. Other airlines may define a maximum advertisement-break duration and systematically start an advertisement-break before each video program. Other parameters may be used to for example avoid an advertisement for a brand being played back-to-back with an advertisement for a competing brand.

A global airline advertisement policy manager allows an airline to declare and define a series of parameters to be taken into account when serving ads to passengers. For example, an airline can define that they will target Business Class and First Class identically and create a virtual class called "Premium Class". They can also define the maximum advertisement break length in number of advertisements, restriction on what type of advertisements cannot be played in the same break, or special types of advertisements that cannot be played associated with certain type of content (ex. alcohol ads in front of Disney movies). These parameters can be global and can always be taken into account for all advertisement campaigns.

An inventory manager can allow an advertiser, or someone acting on their behalf, to create an advertisement campaign. Various parameters can be used to configure and qualify that offer, such as the targeted audience in terms of parameters available from an airline: gender, age, nationality, country of residence, language spoken, destination, class of service, etc. The offer can also specify the contracted number of impressions and the run period for an advertisement campaign. The offer may indicate that the airline is paid once the number of impressions is reached, if the number is reached within the run period. An advertisement controller can also allow an airline or someone acting on their behalf to schedule advertisements based on available inventory. The inventory manager can compute available inventory for a campaign based on already booked inventory for other campaigns in the same period, based on the number of existing reservations for flights running during the period and based on historical impression count for similar flights during similar periods. A machine learning algorithm can be used to adjust a forecast based on prior forecast efficiency of the historical impression count to predict actual impression count for the period and to weight the contribution of the actual booking information versus historical data for the equivalent period. Booking information may be incomplete at the time of the campaign creation, so the algorithm may be able to adjust for that based on historical efficiency of the booking base at the time of the campaign creation to predict the inventory for the period of the campaign.

The inventory manager can receive a passenger manifest (e.g., a qualified list of passengers on a flight) shortly before the flight takes off and compute an optimal mix of advertisements to be served on that flight based on passenger segmentation, the various campaign CPM, the already executed impressions for each campaign, and advertisement inventory forecast for the flight in order to manage advertisement campaigns globally to maximize the CPM at the end of the month or the end of a predetermined payment cycle. The advertisement controller can receive instructions from the inventory manager and serve advertisement based on the instructions and the dynamic parameters applicable for that flight (e.g., if the inventory manager instructs the advertisement controller to play a Marlboro advertisement 55 times during a flight, regardless of passenger age and gender, if a passenger watches a Disney movie, the advertisement cannot be served to this passenger and the inventory manager may not have forecast this).

The advertisement controller and/or the inventory manager can include an impression counter that records the number of impressions that will be stored as historical impression data and creates a report that can be used as a proof of contract fulfillment with advertisers.

Some embodiments allow an airline to update their advertisements from the ground prior to every flight. As a result, advertisements can propagate to any target connected airplane automatically and can be made available immediately for passengers. Some additional or alternative embodiments allow an airline to have a variety of advertisements granular to the flights and passengers. A unique package of advertisements can be prepared for each flight for each passenger, based on targeted rules defined by the inventory manager. The onboard advertisement controller can follow pre-computed rules and instructions to serve advertisements to passenger. Additional or alternative embodiments allow airline to constantly optimize the utilization of their inventory and avoid impression waste. Near-real-time booking of new campaigns can be possible and can allow for a perfect match between committed campaigns and inventory.

The embodiments described herein can provide vehicle operators (e.g., airlines) with an ability to increase advertisement revenue and improve passenger service by managing an inventory of targeted advertisements.

FIG. 1 is a schematic diagram that illustrates an example of an aircraft cabin 140 having an IFE system that includes an advertisement controller 170 for controlling advertisements provided during a flight. The IFE system can also include video display units ("VDUs") 110, wireless access points ("WAPs") 150, a content server 160, and sensors 180. The content server 160 can stream and/or download electronic content through wired networks (e.g., Ethernet) and/or through the WAPSs 150 to the VDUs 110 that may be mounted to structures within the aircraft, including to seatbacks, seat armrests/frames, bulkheads, overhead structures, etc. The content server 160 may additionally stream and/or download electronic content through WAPs 150 to passenger equipment carried on-board by passengers, such as mobile phones, tablet computers, laptop computers, etc.

Some of the sensors 180 may be mounted to structures within the aircraft including seatbacks, seat armrests/frames, bulkheads, or overhead structures. Others of the sensors 180 may be attached to mobile objects including meal carts or uniforms of crew members. Others of the sensors 180 may be included in existing systems such as an IFE system. The sensors 180 can measure characteristics in the aircraft cabin 140 and provide data based on the measurements to the advertisement controller 170. In some examples, the sensors 180 can measure locations or activities of passengers such as whether a passenger is seated, asleep, or watching a movie.

In some embodiments, the VDUs 110 or passenger equipment brought on-board by passengers can be used to receive content from the content server 160. In additional or alternative embodiments, the advertisement controller 170 may cause the VDUs 110 to provide advertisements to passengers. The advertisement controller 170 may determine what advertisement to provide and when to provide the advertisement based on instructions from an inventory management processing device. The inventory management processing device may be located off-board the aircraft 140 and the instructions may indicate that a specific advertisement should be provided during targeted advertisement opportunities that meet a set of criteria (e.g., to a specific demographic of passenger after watching a specific type of movie). In some examples, the advertisement controller 170 may communicate with the content server 160 and sensors 180 to identify that a set of targeting requirements are met and instruct the VDU 110 to display the advertisement. In additional or alternative examples, the advertisement controller 170 may independently determine that a set of targeting requirements are met based on a passenger manifest and assumptions or historical data on how many passengers will change their assigned seat.

Figure 2:
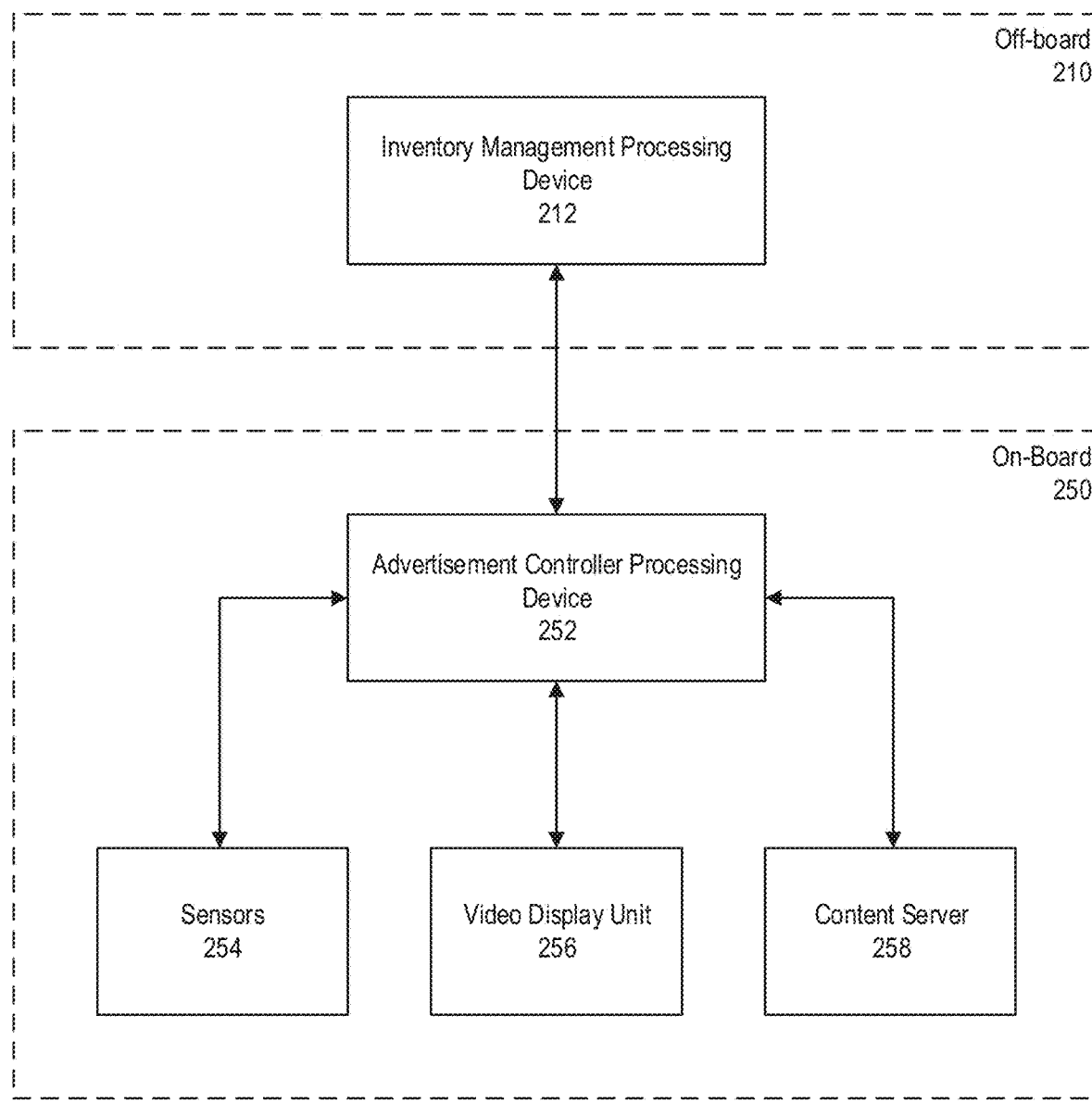
FIG. 2 is a block diagram that illustrates an example of a system with an inventory management processing device that manages an inventory of targeted advertisements and transmits instructions to an advertisement controller processing device according to some embodiments of the present disclosure.

FIG. 2 is a block diagram of a system for managing an inventory of targeted advertisements that includes an off-board portion 210 and an on-board portion 250. The off-board portion 210 can include an inventory management processing device 212. The on-board portion 250 can include an advertisement controller processing device 252 communicatively coupled to sensors 254, VDU 256, and content server 258. The advertisement controller processing device 252 can be an example of the advertisement controller 170 in FIG. 1, the sensors 254 can be examples of the sensors 180 in FIG. 1, the VDU 256 can be an example of the VDU 110 in FIG. 1, and the content server 258 can be an example of the content server 160 in FIG. 1. The VDU 256 can also include personal equipment (e.g., a mobile phone or tablet) for displaying content and advertisements to passengers on-board a vehicle (e.g., an aircraft, a bus, a train, or a boat).

The inventory management processing device 212 can be communicatively coupled to the advertisement controller processing device 252. The inventory management processing device 212 can determine an inventory of targeted advertisements. In some embodiments, the inventory management processing device 212 can receive a request from an advertiser to set up an advertising campaign. The request can indicate a period of time for the advertising campaign and the inventory management processing device 212 can retrieve data indicating a set of future flights scheduled during the period of time. The inventory management processing device 212 can determine an inventory of targeted advertisements based on the set of future flights and set a portion of the inventory of targeted advertisements to be assigned to the advertisement campaign. The inventory management processing device 212 can transmit instructions to the advertisement controller processing device 252 to use a portion of the targeted advertisements available on a specific flight for the advertising campaign.

The advertisement controller processing device 252 can detect a target advertisement opportunity based on communication with the sensors 254, VDU 256, and content server 258. In some example, a targeted advertisement opportunity can be an opportunity to display an advertisement for a passenger watching an action movie. The advertisement controller processing device 252 can receive an indication from the content server 258 that a specific passenger is watching an action movie and transmit instructions to the associated VDU 256 to provide a specific targeted advertisement associated to be displayed during the targeted advertisement opportunity. In additional or alternative examples, the advertisement controller processing device 252 can use advertisement instructions from the inventory management processing device 212 to personalize advertisements for specific passengers.

In some embodiments, the advertisement controller processing device 252 can store trip data regarding the impressions or advertisements viewed during the trip. In additional or alternative embodiments, the advertisement controller processing device 252 can track actions performed by specific passengers as measured by the sensors 254. After the trip, the advertisement controller processing device 252 can transmit the data to the inventory management processing device 212. The inventory management processing device 212 can store the trip data and use the trip data to determine inventory of targeted advertisements and advertisement instructions for subsequent trips.

In some embodiments, the advertisements provided to a specific passenger can be personalized based on the environment of a passenger and determined for the passenger through various monitoring and measurement systems. These determinations can be performed by inventory management processing device 212 while the passenger is off-board and by the advertisement controller processing device 252 while the passenger is on-board. The passenger information can be electronically determined based on what a passenger is doing or experiencing during micro-moments while planning a trip, traveling to the vehicle, waiting to board the vehicle, boarding the vehicle, and during defined phases of the trip.

The inventory management processing device 212 may support hyper-personalization/targeting of individually identified passengers and/or groups of passengers' characteristics. It may operate to identify passengers, learn from them and provide advertisement instructions to the advertisement controller processing device 252 on their trip that provide personalized advertisements.

In some embodiments, all interactions and actions performed by a passenger may be captured in context. For example, if a passenger requests a beverage, the system including the inventory management processing device 212 may log what beverage was selected and what the other options were. External context is also important. All events may be time-stamped and given vehicle context (e.g., at the gate, being taxied, cruising, climbing, descending, or at a specific location). As an ecosystem, the system including the inventory management processing device 212 can be configured to put an interaction in aircraft context: did the event happen during a meal service? While a PA was on? During a specific region fly-over? Shortly after take-off? Just before landing? During turbulence?

Although the system for managing an inventory of targeted advertisements depicted in FIG. 2 includes the on-board portion 250 and the off-board portion 210, in some examples only an on-board portion or off-board portion is provided. FIG. 2 depicts the system for managing an inventory of targeted advertisements as an independent system, but in other embodiments the system can be implemented as part of a larger system. The VDUs 256 can communicate wirelessly using the larger system's wireless backbone and may prevent the need to install additional equipment or systems in the vehicle and the sensors 254 can be powered by the larger system. For example, FIG. 3 depicts an IFE system 300 that includes a subsystem for managing inventory of targeted advertisements.

Figure 3:
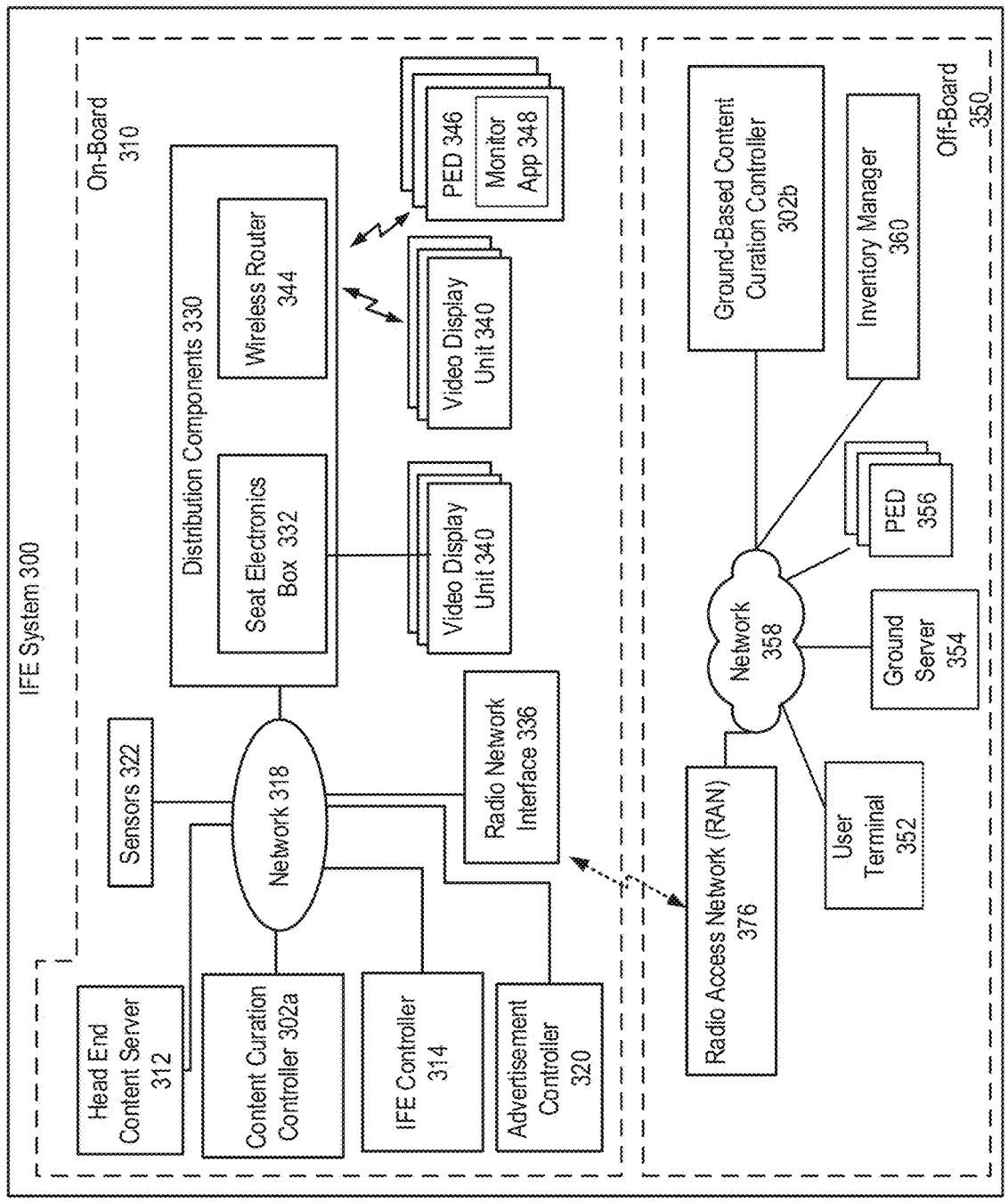
FIG. 3 is a block diagram that illustrates an example of an in-flight entertainment ("IFE") system that includes an inventory management processing device and an advertisement controller processing device according to some embodiments of the present disclosure.

In FIG. 3, the IFE system 300 includes an on-board portion 310 and an off-board portion 350. The on-board portion 310 includes the advertisement controller 320, sensors 322, content delivery devices such as video display units ("VDUs") 340, a head end content server 312, an onboard content curation controller 302a, an IFE controller 314, and additional content delivery devices, such as data traffic distribution components 330. The advertisement controller 320 can be an example of the advertisement controller 170 of FIG. 1, the sensors 322 can be an example of the sensors 180 of FIG. 1, the VDUs 340 can be examples of the VDU 110 in FIG. 1, and the head end content server 312 can be an example of the content server 160 in FIG. 1. The distribution components 330 communicatively connect service delivery devices, such as the VDUs 340 and passenger electronic devices ("PEDs") 346, to other components of the IFE system 300. The off-board portion 350 includes computer systems such as the user terminal 352, the ground-based content server 354, the ground-based content curation controller 302b, and the PED(s) 356 can communicate through a ground-based network 358 (e.g., Internet and/or private network) and one or more radio access networks (RANs) 376 with the IFE system 310 through a radio network interface 336. The RAN(s) 376 and radio network interface 336 may communicate via ground-based radio transceiver stations (e.g., cellular radio base stations or wi-fi at the gate) and/or via satellite-based radio transceivers. The content curation controllers 302a and 302b receive passenger information (including objective and subjective information) from the VDUs 340, the PEDs 356, the user terminal 352, and/or the ground server 354.

Although FIG. 3 shows an independent and centralized onboard advertisement controller 320, in some embodiments, some or all of the functionality disclosed herein for the advertisement controller 320 may be at least partially integrated within seat located components, such as within VDUs 340 located in seatbacks, seat electronics boxes, or armrests or within other IFE components such as the content curation controller 302a, head end content server 312, or IFE controller 314. In additional or alternative embodiments, some or all of the functionality disclosed herein for the sensors 322 may be at least partially integrated within the seat located components.

The inventory manager 360 can generate advertisement instructions and transmit the advertisement instructions to the advertisement controller 320 prior to the flight. The ground-based content curation controller 302b can select what content is distributed to the onboard content curation controller 302a prior to a flight. The advertisement instructions and content can be transmitted from the off-board portion 350 to the on-board portion 310 via the connection between the RAN 376 and the radio network interface 336.

In some further embodiments, an operational feedback loop is provided from an IFE system that includes communicating data from the on-board portion 310 to the off-board portion 350. The data can include characteristics of passengers that have been sensed and/or identified by the IFE system. In some examples, the data can include a count of how often an advertisement has been shown to a targeted passenger or a targeted group of passengers, how much of the advertisement was viewed, and whether any action was taken after viewing the advertisement. In some additional embodiments, passenger experience can be enhanced, and advertisement relevancy increased by the advertisement instructions causing a specific advertisement to be provided to a specific passenger or a specific group of passengers (e.g., based on demographic, destination, or class) at a specific point during the flight. For example, the data from previous flights may indicate that a specific passenger generally watches a movie, requests a drink, and then watches another movie on an eight-hour flight. The inventory manager 360 can provide the advertisement controller 320 with instructions to provide an advertisement including a coupon for a specific drink after the targeted passenger finishes watching a movie.

In some additional or alternative embodiments, the advertisement controller 320 or inventory manager 360 can query passengers through surveys if they like or dislike the advertisements they are being provided. The inventory manager 360 may provide the survey to passengers before they board an aircraft and have an opportunity to interact with the IFE system 300, such as during a ticket reservation phase of interaction with passengers, during preflight phase while passengers are awaiting boarding of a flight, and/or during other preflight and/or post-flight time (where post-flight surveys can be used to control delivery of advertisements on subsequent flights to those surveyed passengers). These surveys can allow the inventory manager 360 to provide advertisement instructions to the advertisement controller 320 that improve the experience of the passenger by providing more personalized advertisements. Furthermore, the inventory manager 360 can offer targeted advertisements to advertisers such that advertisers can purchase more personalized or more finely-targeted advertisement opportunities.

Figure 4:
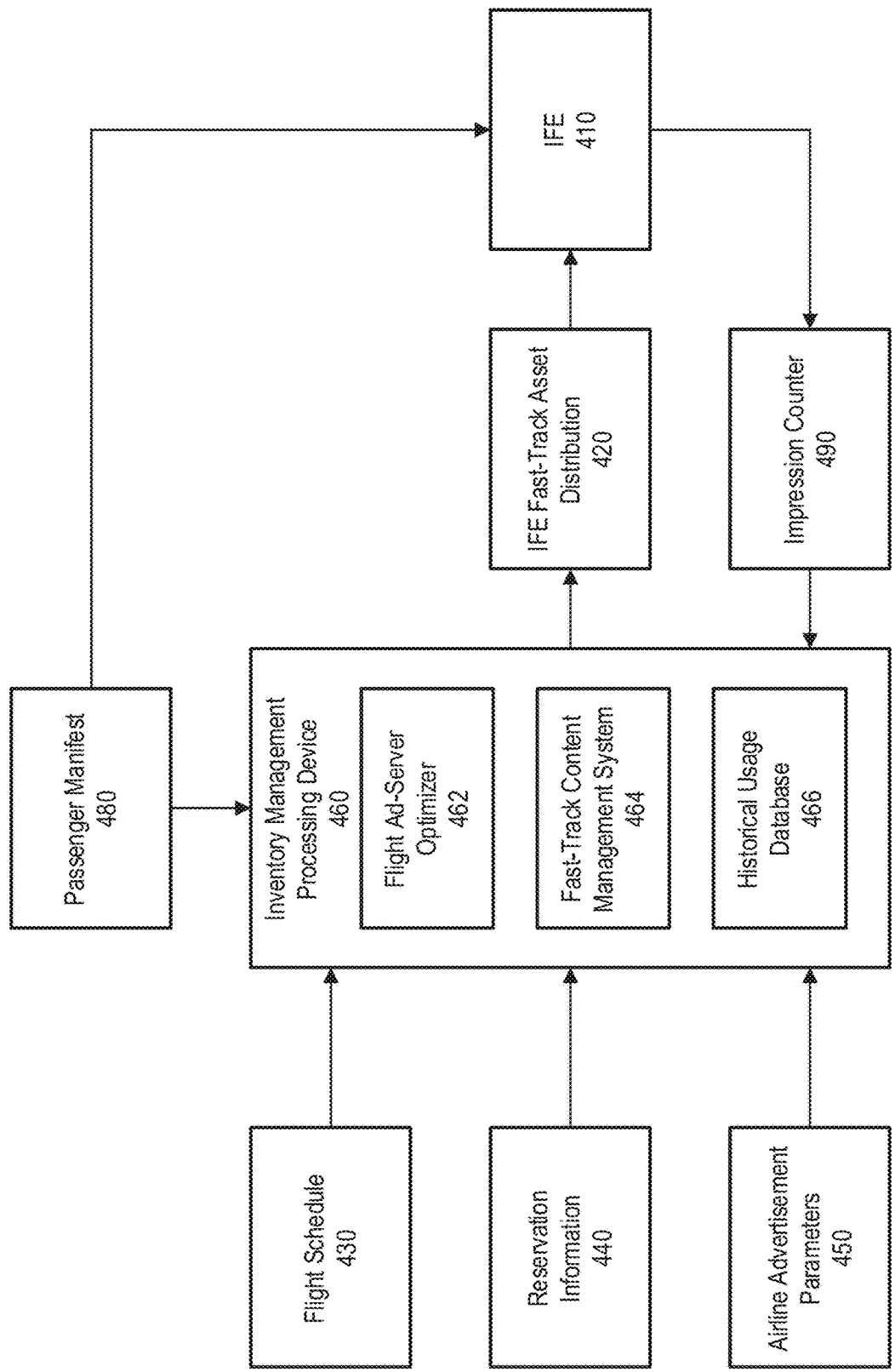
FIG. 4 is a block diagram that illustrates an example of inventory management processing device for communicating with an IFE system to manage targeted advertisements according to some embodiments of the present disclosure.

FIG. 4 is a block diagram of an example of an inventory management processing device 460 for communicating with an IFE system 410 to manage targeted advertisements. The inventory management processing device 460 can include a flight ad-server optimizer 462, a fast-track content management system 464, and a historical usage database 466. The inventory management processing device 460 can receive a flight schedule 430, reservation information 440, airline advertisement parameters 450, a passenger manifest 480, and an impression counter 490. The flight schedule 430 can identify future flights and indicate characteristics of the future flights such as origin, destination, and duration. The reservation information 440 can identify passengers that have booked flights. The airline advertisement parameters 450 can be rules provided by a specific airline regarding when and/or how (e.g., how often or number per ad break) advertisements are played and any conditions on the content of the advertisement. The passenger manifest 480 can provide specific information on passengers that have boarded a flight including seat number, gender, age, and nationality. The flight ad-server optimizer 462 can use historical data retrieved from the historical usage database 466 to determine advertisement instructions for a particular flight. The advertisement instructions can include a package of potential advertisements to be shown on the flight and conditions in which to provide the advertisements. The fast-track content management system 464 can transmit the advertisement instructions to the IFE 410 operation on the flight via the IFE fast-track asset distribution 420.

The IFE 410 can also receive the passenger manifest 480 and may include an advertisement controller for executing the advertisement instructions and providing the advertisements during targeted advertisements. The IFE 410 can transmit the impression counter 490 to the inventory management processing device 460. The impression counter 490 can indicate an advertisement was shown during a targeted advertisement opportunity. The inventory management processing device 460 can use the impression counter 490 to ensure that advertisement campaign contracts are fulfilled and to update the historical usage database 466.

In some embodiments, the inventory management processing device 460 can receive an inquiry from an advertiser to set up an advertising campaign. The inquiry can indicate targeting requirements.

In one example, a basketball team may wish to advertise an upcoming game, but the basketball team may want to limit the advertisements to 1) passengers that are men; 2) passengers that are older than 21; 3) passengers that are headed towards the city in which the game is being played; and 4) passengers traveling prior to the game. Based on these targeting requirements, in some examples, the inventory management processing device 460 may determine which passengers of future flights meet these requirements and retrieve historical usage data from the historical usage database 466 for each of these passengers. In additional or alternative examples, the inventory management processing device 460 may estimate the number of passengers that will meet the target profile in the flights scheduled for the duration of the campaign based on historical data on similar flights. The estimated number of passengers can be further based on the number of bookings already available at the time the campaign is launched and refined with the data becoming available as the campaign progresses. In some embodiments, the inventory management processing device 460 can then determine the inventory for targeted advertisements for these targeting requirements based on the retrieved historical usage data and determine a CPM to charge for a portion of the inventory. In additional or alternative embodiments, the CPM may be fixed and the retrieved historical usage data can be used to optimize which campaign is played with the highest priority. In response to the basketball team accepting the terms of the advertisement campaign, the flight ad-sever optimizer 462 can include the advertisement in advertisement instructions transmitted to the IFE 410 for flights expected to have a portion of the inventory. Once the advertisement campaign is expired (e.g., past the game day) the flight ad-server optimizer 462 can transmit instructions to the IFE 410 to ensure the advertisement is no longer provided. In some examples, the instructions may cause the IFE 410 to delete the advertisement (e.g., the advertisement content/asset such as the physical video, audio, or images and associated metadata) from local memory. In this example, the inventory management processing device 460 may allow the airline to obtain greater revenue, prevents the basketball team from paying for advertisements that are directed to uninterested consumers or advertisements provided after the game, and improves personalization of advertisement experience for passengers.

In additional or alternative examples, a beverage company may wish to advertise a beverage on future flights, but the beverage company may want to limit the advertisements to 1) passengers that have ordered the beverage on a flight before; 2) on flights longer than 4 hours; and 3) a time period just before completion of a movie. In response to acceptance of the terms of the advertisement campaign by the beverage company, the flight ad-server optimizer 462 can determine instructions that limit the IFE 410 to only providing the advertisement when the conditions are met. In this example, the inventory management processing device 460, can allow hyper-personalized advertisements for in-flight purchasing opportunities.

Figure 5:
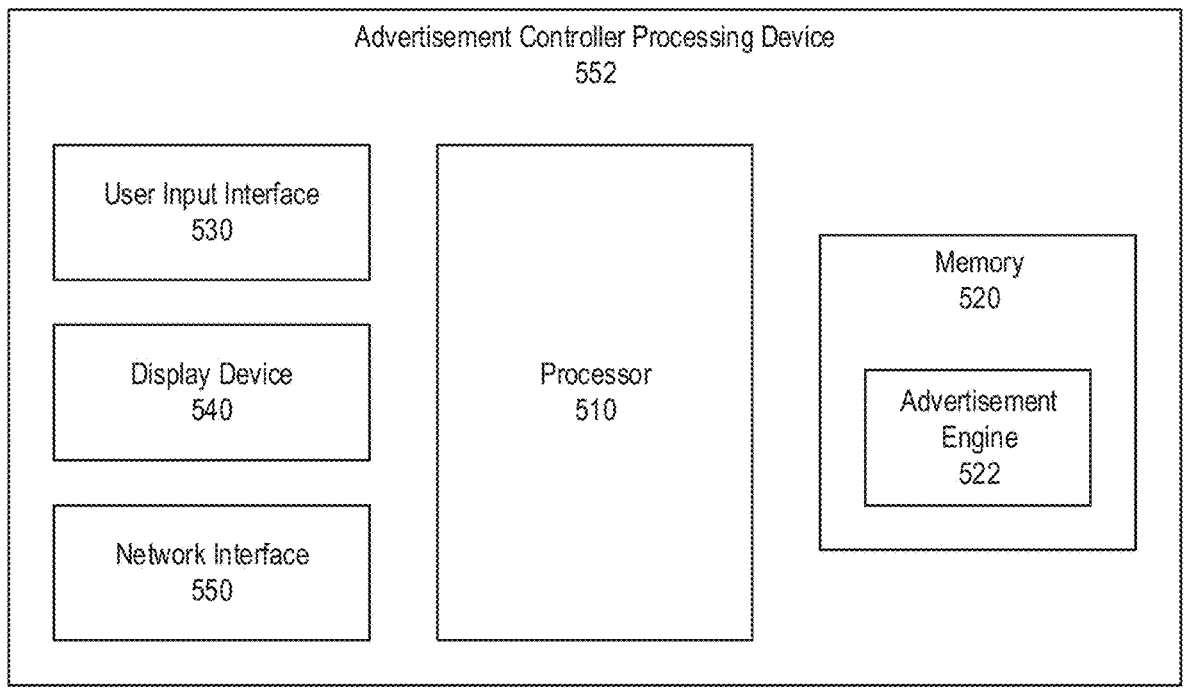
FIG. 5 is a block diagram that illustrates an example of an advertisement controller processing device according to some embodiments of the present disclosure.

FIG. 5 is a block diagram of an example of an assignment controller processing device 552 that is configured to operate according to some embodiments of the present disclosure. The assignment controller processing device 552 can be an example of the advertisement controller 170 of FIG. 1, advertisement processing device 252 of FIG. 2, or advertisement controller 320 of FIG. 3. The advertisement controller processing device 552 includes at least one processor circuit 510 (referred to as a processor for brevity), at least one memory circuit 520 (referred to as a memory for brevity), a user input interface 530, a display device 540, and a network interface 550. In some examples, the display device 540 can include a graphical display device that may include a touch sensitive display. The user input interface 530 can include a keypad, buttons, or a touch sensitive interface. The network interface 550 can include a wired (e.g., ethernet) or wireless transceiver for communicating with other devices such as sensors, content servers, VDUs, or the inventory management processing device 612 of FIG. 6.

The processor 510 can include one or more data processing circuits, such as a general purpose and/or special purpose processor (e.g., microprocessor and/or digital signal processor) that may be collocated or distributed across one or more networks. The processor 510 is configured to execute computer program code in the memory 520, described below as a non-transitory computer readable medium, to perform at least some of the operations described herein as being performed by an advertisement controller or advertisement controller processing device. For example, the advertisement controller processing device 552 can execute advertisement engine 522 stored in memory 520 to provide an advertisement during a targeted advertisement opportunity.

Figure 6:
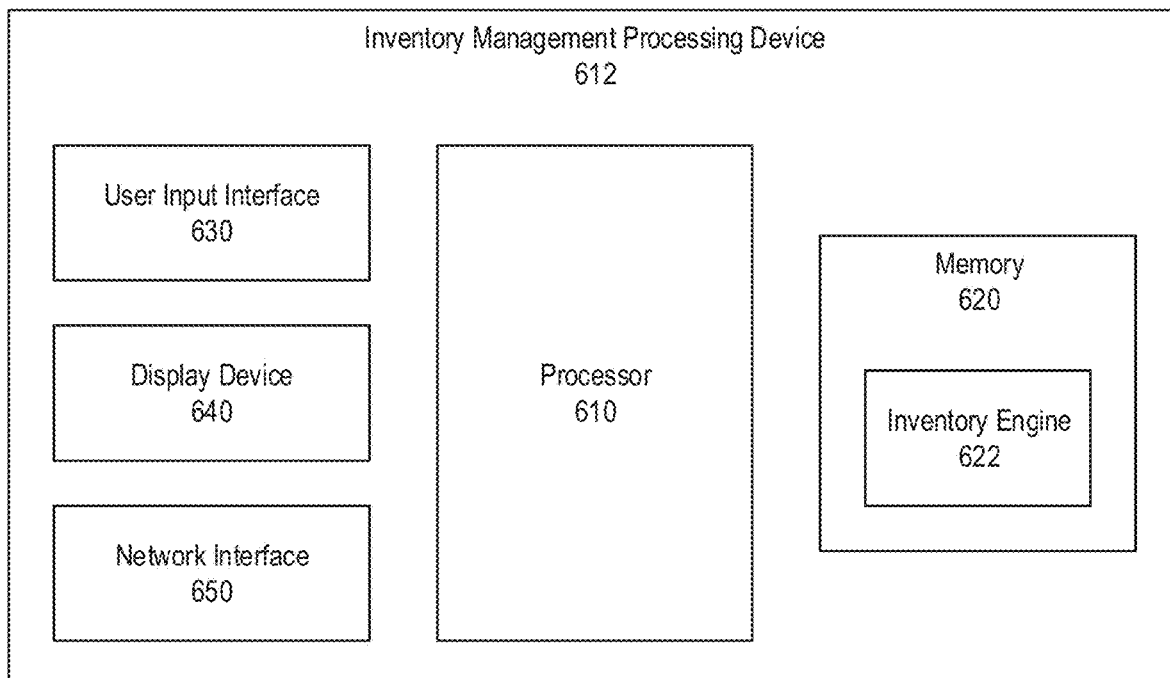
FIG. 6 is a block diagram that illustrates an example of an inventory management processing device according to some embodiments of the present disclosure.

FIG. 6 is a block diagram of an example of an inventory management processing device 612 that is configured to operate according to some embodiments of the present disclosure. The inventory management processing device 612 can be an example of the inventory management processing device 212 of FIG. 2, the inventory manager 360 of FIG. 3, or the inventory management processing device 460 of FIG. 4. The inventory management processing device 612 includes at least one processor circuit 610 (referred to as a processor for brevity), at least one memory circuit 620 (referred to as a memory for brevity), a user input interface 630, a display device 640, and a network interface 650. In some examples, the display device 640 can include a graphical display device that may include a touch sensitive display. The user input interface 630 can include a keypad, buttons, or a touch sensitive interface. The network interface 650 can include a wired (e.g., ethernet) or wireless transceiver for communicating with other devices such as the advertisement controller processing device 552 of FIG. 5 or remote devices associated with advertisers.

The processor 610 can include one or more data processing circuits, such as a general purpose and/or special purpose processor (e.g., microprocessor and/or digital signal processor) that may be collocated or distributed across one or more networks. The processor 610 is configured to execute computer program code in the memory 620, described below as a non-transitory computer readable medium, to perform at least some of the operations described herein as being performed by an inventory manager or inventory management processing device. For example, the inventory management processing device 612 can execute the inventory engine 622 stored in memory 620 to generate advertisement instructions for a trip based on a request for advertisements associated with an advertiser to be provided during a portion of targeted advertisements.

Figure 7:
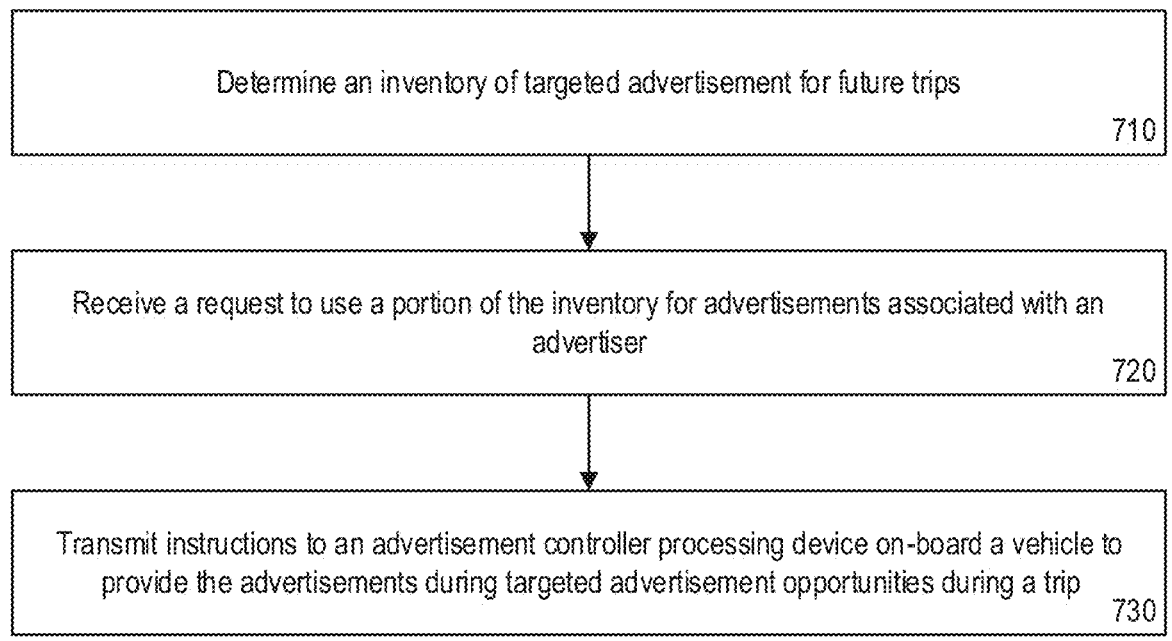
FIG. 7 is a flow diagram that illustrates an example of a process for managing advertisements provided on-board a vehicle during a trip according to some embodiments of the present disclosure.

FIG. 7 is a flow chart of an example of a process for managing advertisements provided on-board a vehicle (e.g., an airplane, a train, a bus, or a boat) during a trip. The process is described below in reference to the inventory management processing device 652 of FIG. 6, but other implementations are possible.

Figure 8:
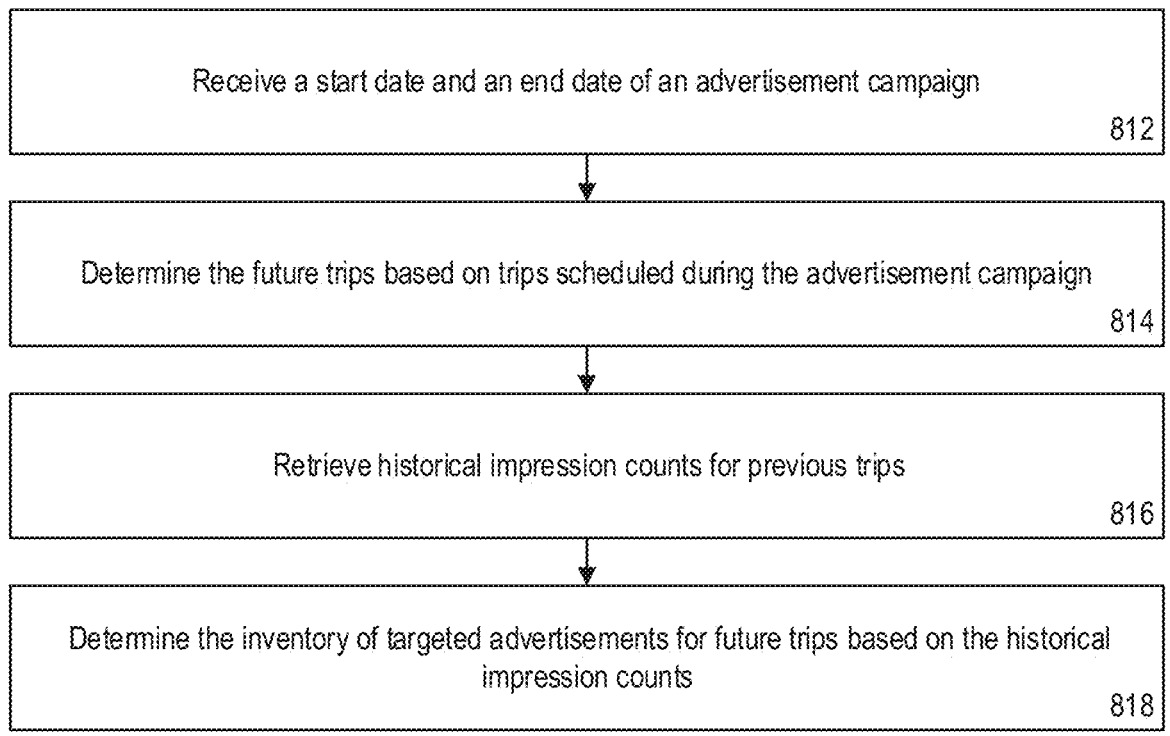
FIG. 8 is a flow diagram that illustrates an example of a process for determining an inventory of targeted advertisements for future trips according to some embodiments of the present disclosure.

At block 710, processor 610 determines an inventory of targeted advertisements for future trips. The inventory of targeted advertisements can be based on targeting restrictions of a specific advertisement campaign. FIG. 8 is a flow chart of an example of a process for determining an inventory of targeted advertisements for future trips. The process is described below in reference to the inventory management processing device 652 of FIG. 6, but other implementations are possible.

At block 812, processor 610 receives, via network interface 650, a start date and an end date of an advertisement campaign. In some examples, the end date may not be reached during a campaign in which a predetermined number of impressions are made prior to the end date. Instead, the campaign may end in response to determining that the predetermined number of impressions have been reached or exceeded. In additional or alternative examples, the end date may be a renewal date such that the advertisement campaign renews on the renewal date. The campaign may only be renewed if predetermined conditions are met. The conditions can include a predetermined number of impressions being made prior to the renewal date and an additional payment being made by the advertiser.

At block 814, processor 610 determines the future trips based on trips scheduled during the advertisement campaign and/or based on historical data associated with a similar time period (e.g., last year, last week, or last month). The processor 610 can retrieve a list of all flights on the airline scheduled between the start date and the end date. In some examples, additional targeting restrictions may limit the flights based on their origin, destination, or duration.

At block 816, processor 610 receives, via network interface 650, historical impression counts for previous trips. The historical impression counts may be given a weight based on how similar to the previous flights were to the future flights.

Similarity may be based on features of the plane such as size or model; features of the flight such as origin, destination, duration, time of year; or similarity of passengers. At block 818, processor 610 determines the inventory of targeted advertisements for future trips based on the historical impression counts. The processor 610 may estimate the inventory based on the historical impression counts and the weights. In some examples, machine learning algorithms may be used to improve estimation of the inventory by analyzing various flights.

In some embodiments, the operations described in blocks 812, 814, 816, and 818 may be performed in another order and/or some operations may be omitted.

Returning to FIG. 7, in some embodiments, processor 610 receives targeting requirements for the advertisement campaign. The targeting requirements can indicate a type of targeted advertisement opportunity desired by the advertiser. The processor 610 can determine the inventory of targeted advertisements for future trips that meet the targeting requirement.

In additional or alternative embodiments, processor 610 can receive the targeting requirements indicating that the type of targeted advertisement opportunity desired by the advertiser are advertisements that are associated with airplane passengers having specific characteristics. In some examples, the processor 610 can receive a list of currently booked passengers for each future flight and determine the inventory of targeted advertisements based on the list of currently booked passengers. In additional or alternative examples, the processor 610 can estimate additional passengers for each future flight based on historical data of similar flights and determine the inventory of targeted advertisements based on the estimated additional passengers. The specific characteristics can include an age, a gender, and a ticket class status of an airplane passenger. For example, processor 610 can receive targeting requirements indicating that the advertiser wants to provide advertisements to men over forty flying in coach. The processor 610 can determine an inventory of targeted advertisements based on a number of passengers on each future flight that met these targeting requirements.

In additional or alternative embodiments, processor 610 can receive a passenger manifest shortly before a flight. The processor 610 can determine an advertisement playlist or specific instructions for an advertisement manager on the flight based on the passenger manifest.

In additional or alternative embodiments, processor 610 can receive targeting requirements indicating the type of targeted advertisement opportunity desired by the advertiser are targeted advertisements that are associated with airplane passengers performing specific activities. The processor 610 can retrieve historical activity data for passengers on future flights and determine an inventory of targeted advertisements based on the historical activity data. The specific activities can include watching a movie, going to the bathroom, requesting a drink, going to sleep, or paying for a seat upgrade.

In additional or alternative embodiments, processor 610 can receive targeting requirements indicating the type of targeted advertisement opportunity desired by the advertiser are targeted advertisement opportunities that are associated with flights having specific characteristics. The specific characteristics can include at least one of: a specific destination, a specific origin, a specific time of day, and a specific length.

At block 720, processor 610 receives, via network interface 650, a request to use a portion of the inventory for advertisements associated with an advertiser. In some embodiments, the request is in response to an offer provided by the processor 610. The offer could have indicated a cost (e.g., CPM) based on the size or specificity of the targeted advertisement opportunity. In additional or alternative embodiments, the request includes the advertisement, for example, in a digital format.

At block 730, processor 610 transmits, via network interface 650, instructions to an advertisement controller processing device on-board a vehicle to provide the advertisements during targeted advertisement opportunities during a trip. In some examples, the advertisement instructions include the advertisements, separate from entertainment content, and are provided within a predetermined time of the trip. In some examples, the predetermined time may be a few minutes before departure. In additional or alternative examples, the predetermined time may be within twenty-four hours of departure. In additional or alternative examples, the advertisement instructions can be based on airline parameters and may instruct the advertisement controller processing device on when to provide an advertisement and what advertisement to provide. The entertainment content or advertisement assets (e.g., the video, audio, or image files) may be loaded separate from the advertisement instructions (e.g., 1-5 days prior to the start of a campaign using those assets).

In some embodiments, the operations described in blocks 710, 720, and 730 may be performed in another order and/or some operations may be omitted.

Figure 9:
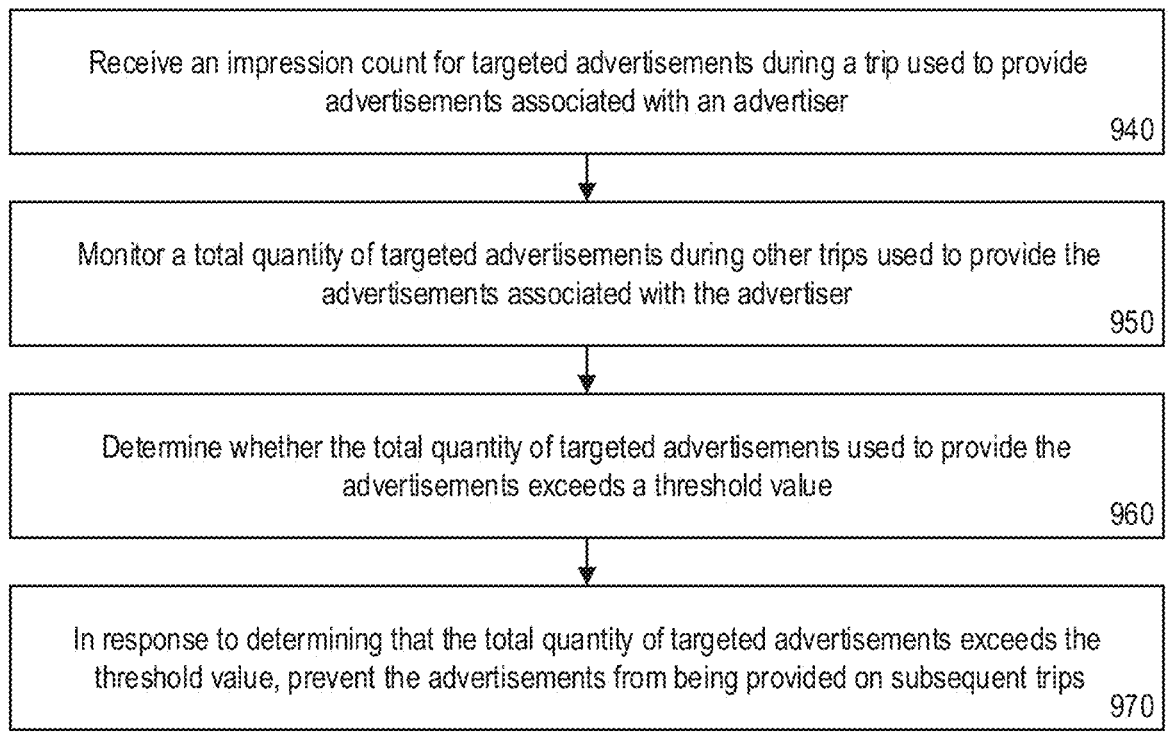
FIG. 9 is a flow diagram that illustrates an example of a process for providing a portion of the targeted advertisements to an advertiser according to some embodiments of the present disclosure.

FIG. 9 is a flow chart of an example of a process for providing a portion of the targeted advertisements to an advertiser. The process is described below in reference to the inventory management processing device 652 of FIG. 6, but other implementations are possible.

At block 940, processor 610 receives, via network interface 650, an impression count for targeted advertisements during a trip used to provide advertisements associated with an advertiser. The impression count can further include contextual data such as when the advertisement was provided and what actions were taken by the passenger after viewing the advertisement.

At block 950, processor 610 monitors a total quantity of targeted advertisements used to provide the advertisements associated with the advertiser. For example, processor 610 can receive impression counts from trips (e.g., the "future trips" that were scheduled at the start of the campaign and other trips that occur during the campaign). At block 960, processor 610 determines whether the total quantity of targeted advertisement opportunities used to provide the advertisements exceeds a threshold value.

At block 970, in response to determining that the total quantity of targeted advertisements exceeds the threshold value, prevent the advertisements from being provided on subsequent trips.

In some embodiments, in response to determining that the total quantity of targeted advertisements exceeds the threshold value, processor 610 can prevent the advertisements from being provided on subsequent flights. In some examples, the processor 610 may transmit, in near-real time to determining the total quantity exceeded the threshold (e.g., during a flight), updated instructions to the advertisement controller to cause the advertisement controller to cease providing the advertisement. In additional or alternative examples, the processor 610 may exclude the advertisement from subsequent instructions to subsequent flights. In additional or alternative embodiments, in response to determining that the total quantity of targeted advertisements exceeds the threshold value, processor 610 can transmit a bill to the advertiser and renew the advertisement campaign.

In some embodiments, the operations described in blocks 940, 950, 960, and 970 may be performed in another order and/or some operations may be omitted.

Figure 10:
FIG. 10 is a diagram that illustrates an example of a user interface for requesting targeting requirements from an advertiser according to some embodiments of the present disclosure.

FIG. 10 is a diagram that illustrates an example of a user interface ("UI") 1000 for requesting targeting requirements from an advertiser. The UI 1000 has a field for a start date 1010 and an end date 1020 for an advertisement campaign. The UI 1000 also has a segmentation section 1030 for indicating targeting requirements. In this example, portions of the segmentation section 1030 are selected to limit the potential advertising campaign to passengers in the age ranges of 24-34 and 45-54, that are female, traveling away from home, are not frequent flyers and are either in business class or premium economy class. The UI 1000 also includes a content section 1040 for uploading the advertisement to be used.

Figure 11:
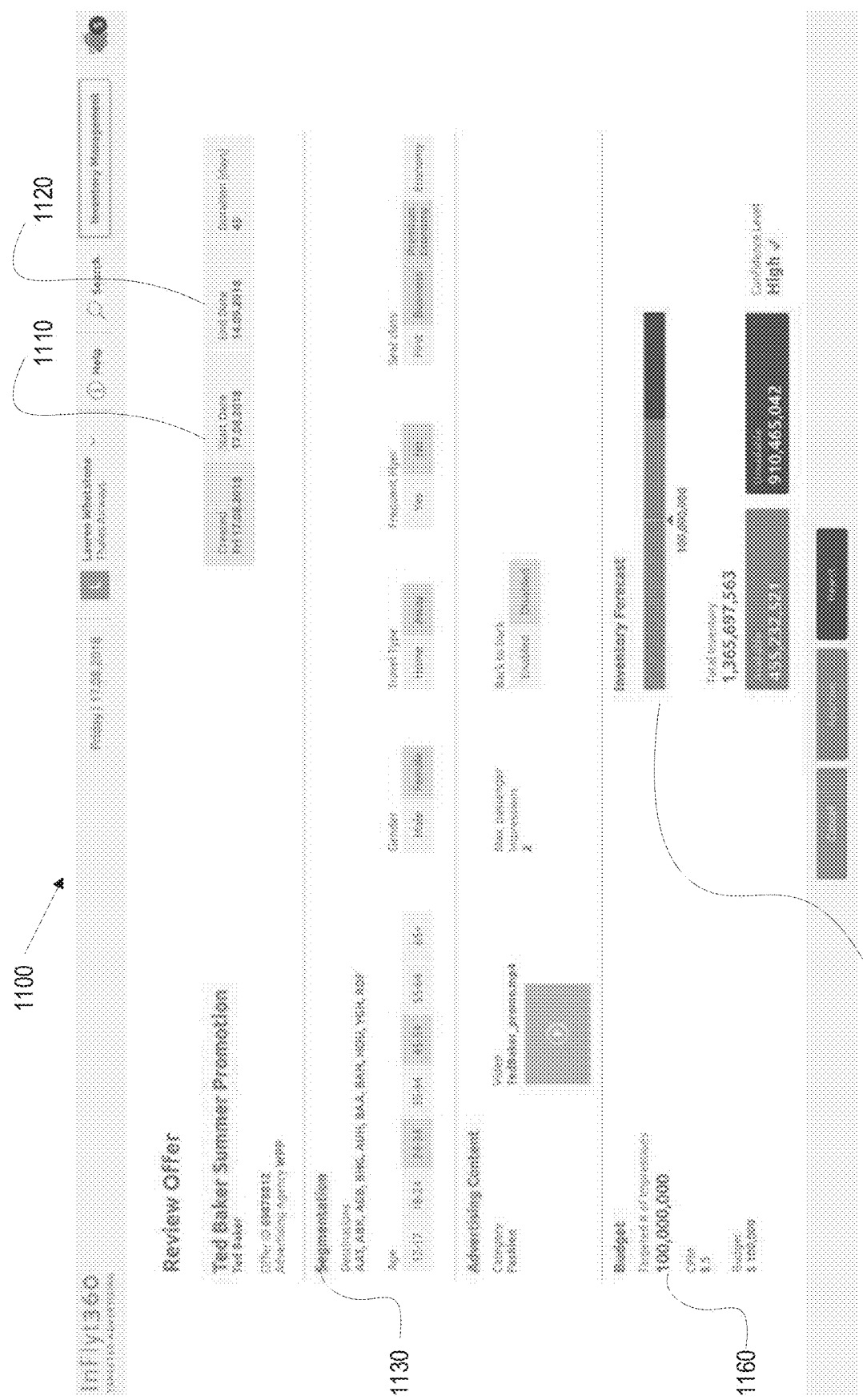
FIG. 11 is a diagram that illustrates an example of a user interface for displaying inventory for targeted advertisements according to some embodiments of the present disclosure.

FIG. 11 is a diagram that illustrates an example of a UI 1100 for displaying inventory for proposed targeted advertisements. The UI 1100 indicates a start date 1110 and an end date 1120 for proposed targeted advertisements. The UI 1100 includes a segmentation section 1130 indicating the targeting requirements associated with the proposed targeted advertisements. The UI 1100 also includes an inventory forecast 1150 that indicates what percentage of the forecasted inventory is being purchased by the advertiser. The UI 1100 also includes a budget section 1160 indicating the CPM to be paid by the advertiser for the advertisement campaign.

Figure 12:
FIG. 12 is a diagram that illustrates an example of a user interface for displaying progress for an advertisement campaign according to some embodiments of the present disclosure.

FIG. 12 is a diagram that illustrates an example of a UI 1200 for displaying progress for advertisement campaigns. The UI 1200 illustrates a status 1210 of different advertisement campaigns. The UI 1200 can be used to quickly identify advertisement campaigns that are completed as well as advertisement campaigns that are not on track for completion.

Figure 13:
FIG. 13 is a diagram that illustrates an example of a user interface for displaying inventory for an advertisement campaign according to some embodiments of the present disclosure.

FIG. 13 is a diagram that illustrates an example of a UI 1300 for displaying inventory for an advertisement campaign. In this example, the UI 1300 depicts the inventory of other age ranges to show where the advertisement campaign may be expanded.

Acronyms

VOD Video-On-Demand
PED Personal Electronic Device
VDU Video Display Unit
WAP Wireless Access Point
IFE In-flight Entertainment System
CPM Costs per Thousands of Impressions Further Embodiments and Definitions In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A system for managing advertisements in an in-flight entertainment ("IFE") system operating on an airplane, the system comprising:
    an inventory processing device; and
    a non-transitory computer readable medium communicatively coupled to the inventory processing device to cause the inventory processing device to perform operations comprising:
        receiving targeting requirements for an advertisement campaign, the targeting requirements indicating a type of targeted advertisements desired by an advertiser including targeted advertisement opportunities that are associated with airplane passengers performing specific activities during a flight, the specific activities being separate from demographic data associated with the airplane passengers;
        determining an inventory of targeted advertisements for a plurality of future flights based on the targeting requirements by i) retrieving a list of booked passengers for each flight of the plurality of future flights, ii) estimating additional expected passengers for each flight of the plurality of future flights, and iii) determining the inventory of targeted advertisements based on the list of booked passengers for each flight of the plurality of future flights and the additional expected passengers for each flight of the plurality of future flights;
        responsive to determining the inventory, receiving a request to use a portion of the inventory for advertisements associated with the advertiser;
        responsive to receiving the request and prior to departure, transmitting instructions to an advertisement controller processing device on-board the airplane to cause the advertisement controller processing device to provide the advertisement during targeted advertisement opportunities during the flight, the instructions being independent from entertainment content;
        receiving an impression count from the advertisement controller processing device on-board the airplane indicating a first quantity of targeted advertisements during the flight used to provide the advertisements;
        monitoring a total quantity of targeted advertisements used to provide the advertisements;

determining whether the total quantity of targeted advertisements exceeds a threshold value that is based on the request to use the portion of the inventory for the advertisements associated with the advertiser; and in response to determining that the total quantity of targeted advertisements exceeds the threshold value, preventing the advertisements from being provided on subsequent flights, wherein the impression counter is used to create a report ensuring a proof of contract fulfillment of the advertisement campaign with the advertiser.

2. The system of claim 1, wherein determining the inventory of targeted advertisements for the plurality of future flights comprises:

receiving a start date and end date of the advertisement campaign associated with the advertiser;

determining the plurality of future flights based on at least one of: historical data for flights during a similar time period and flights scheduled between the start date and the end date of the advertisement campaign;

retrieving historical impression counts for previous flights based on the plurality of future flights; and determining the inventory of targeted advertisements for the plurality of future flights based on the historical impression counts.

3. The system of claim 2, wherein determining the inventory of targeted advertisements for the plurality of future flights further comprises:

determining the inventory of targeted advertisements for the plurality of future flights that meet the targeting requirements.

4. The system of claim 1, wherein receiving the targeting requirements for the advertisement campaign comprises:

receiving the targeting requirements indicating the type of targeted advertisements desired by the advertiser are targeted advertisement opportunities that are associated with airplane passengers having specific characteristics.

5. The system of claim 4, wherein receiving the targeting requirements comprises:

receiving targeting requirements indicating the type of targeted advertisements desired by the advertiser are targeted advertisement opportunities that are associated with airplane passengers having a specific demographic, the specific demographic comprising at least one of: an age, a gender, a nationality, a ticket class status, and a frequent flyer status, wherein retrieving the passenger manifest for each flight of the plurality of future flights comprises retrieving demographic data for airplane passengers in the passenger manifest for each flight of the plurality of future flights.

6. The system of claim 4, wherein determining the inventory of targeted advertisements for the plurality of future flights further comprises:

retrieving historical activity data for specific passengers, the specific passengers being based on the passenger manifest for each flight of the plurality of future flights, and the historical activity data indicating activities performed by the specific passengers on previous flights; and determining the inventory of targeted advertisements for the plurality of future flights based on the desire to limit the advertisement to targeted advertisement opportunities that are associated with airplane passengers performing specific activities and the historical activity data.

7. The system of claim 6, wherein receiving targeting requirements comprises receiving targeting requirements indicating the type of targeted advertisements desired by the advertiser are targeted advertisement opportunities that are associated with airplane passengers that have performed at least one of the following specific activities: gone to a bathroom, requested a drink, and gone to sleep.

8. The system of claim 3, wherein receiving the targeting requirements for the advertisement campaign comprises:

receiving the targeting requirements indicating the type of targeted advertisements desired by the advertiser are targeted advertisement opportunities that are associated with flights having specific characteristics, the specific characteristics comprising at least one of: a specific destination, a specific origin, a specific time of day, and a specific length.

9. The system of claim 3, the operations further comprising:

determining a price for the portion of the inventory based on the targeting requirements.

10. The system of claim 1, wherein the operations further comprise:

in response to determining that the total quantity of targeted advertisements exceeds the threshold value, freeing previously booked inventory to be used for other campaigns.

11. The system of claim 1, wherein transmitting the instructions to the advertisement controller processing device on-board the airplane comprises transmitting the advertisement including an advertisement asset and metadata, independent from the entertainment content, to the advertisement controller within a predetermined time of every flight.

12. A method for managing advertisements in an in-flight entertainment ("IFE") system operating on an airplane, the method comprising:

receiving targeting requirements for an advertisement campaign, the targeting requirements indicating a type of targeted advertisements desired by an advertiser including targeted advertisement opportunities that are associated with airplane passengers performing specific activities during a flight, the specific activities being separate from demographic data associated with the airplane passengers;

determining an inventory of targeted advertisements for a plurality of future flights based on the targeting requirements by i) retrieving a list of booked passengers for each flight of the plurality of future flights, ii) estimating additional expected passengers for each flight of the plurality of future flights, and iii) determining the inventory of targeted advertisements based on the list of booked passengers for each flight of the plurality of future flights and the additional expected passengers for each flight of the plurality of future flights;

responsive to determining the inventory, receiving a request to use a portion of the inventory for the advertisements associated with the advertiser;

responsive to receiving the request and prior to departure, transmitting instructions to an advertisement controller processing device on-board the airplane to cause the advertisement controller processing device to provide the advertisements during the targeted advertisement opportunities during the flight, the instructions being independent from entertainment content;

receiving an impression count from the advertisement controller processing device on-board the airplane indicating a first quantity of targeted advertisements during the flight used to provide the advertisements;

monitoring a total quantity of targeted advertisements used to provide the advertisements;

determining whether the total quantity of targeted advertisements exceeds a threshold value that is based on the request to use the portion of the inventory for the advertisements associated with the advertiser; and in response to determining that the total quantity of targeted advertisements exceeds the threshold value, preventing the advertisements from being provided on subsequent flights, wherein the impression count is used to create a report ensuring a proof of contract fulfillment of the advertisement campaign with the advertiser.

13. The method of claim 12, wherein determining the inventory of targeted advertisements for the plurality of future flights comprises:

receiving a start date and end date of the advertisement campaign associated with the advertiser;

determining the plurality of future flights based on flights scheduled between the start date and the end date of the advertisement campaign;

retrieving historical impression counts for previous flights based on the plurality of future flights; and determining the inventory of targeted advertisements for the plurality of future flights based on the historical impression counts.

14. The method of claim 13, wherein determining the inventory of targeted advertisements for the plurality of future flights further comprises:

determining the inventory of targeted advertisements for the plurality of future flights that meet the targeting requirements.

15. The method of claim 12, wherein receiving the targeting requirements for the advertisement campaign comprises:

receiving the targeting requirements indicating the type of targeted advertisements desired by the advertiser are targeted advertisement opportunities that are associated with airplane passengers having specific characteristics.

16. The method of claim 15, wherein receiving the targeting requirements comprises:

receiving targeting requirements indicating the type of targeted advertisements desired by the advertiser are targeted advertisement opportunities that are associated with airplane passengers having a specific demographic, the specific demographic comprising at least one of: an age, a gender, and a ticket class status, wherein retrieving the passenger manifest for each flight of the plurality of future flights comprises retrieving demographic data for airplane passengers in the passenger manifest for each flight of the plurality of future flights.

17. The method of claim 15, wherein determining the inventory of targeted advertisements for the plurality of future flights further comprises:

retrieving historical activity data for specific passengers, the specific passengers being based on the passenger manifest for each flight of the plurality of future flights, and the historical activity data indicating activities performed by the specific passengers on previous flights; and determining the inventory of targeted advertisements for the plurality of future flights based on the desire to limit the advertisement to targeted advertisement opportunities that are associated with airplane passengers performing specific activities and the historical activity data.

18. The method of claim 17, wherein receiving targeting requirements comprises receiving targeting requirements indicating the type of targeted advertisements desired by the advertiser are targeted advertisement opportunities that are associated with airplane passengers that have performed at least one of the following specific activities: gone to a bathroom, requested a drink, and gone to sleep.

19. The method of claim 14, wherein receiving the targeting requirements for the advertisement campaign comprises:

receiving the targeting requirements indicating the type of targeted advertisements desired by the advertiser are targeted advertisement opportunities that are associated with flights having specific characteristics, the specific characteristics comprising at least one of: a specific destination, a specific origin, a specific time of day, and a specific length.

20. The method of claim 14, the operations further comprising:

determining a price for the portion of the inventory based on the targeting requirements.

21. The method of claim 12, wherein transmitting the instructions to the advertisement controller processing device on-board the airplane comprises transmitting the advertisement, independent from the entertainment content, to the advertisement controller within a predetermined time of every flight.

22. A system for managing advertisements in a video-on-demand ("VOD") system operating in a vehicle, the system comprising:

an inventory processing device; and a non-transitory computer readable medium communicatively coupled to the inventory processing device to cause the inventory processing device to perform operations comprising:

determining an inventory of targeted advertisements for a plurality of future flights by i) retrieving a list of booked passengers for each flight of the plurality of future flights, ii) estimating additional expected passengers for each flight of the plurality of future flights, and iii) determining the inventory of targeted advertisements based on the list of booked passengers for each flight of the plurality of future flights and the additional expected passengers for each flight of the plurality of future flights;

responsive to determining the inventory, receiving a request to use a portion of the inventory for the advertisements associated with an advertiser; and responsive to receiving the request and prior to departure, transmitting instructions to an advertisement controller processing device on-board the vehicle to cause the advertisement controller processing device to provide the advertisements during targeted advertisement opportunities during a trip, the instructions being independent from entertainment content;

receiving an impression count from the advertisement controller processing device on-board the vehicle indicating a first quantity of targeted advertisements during the trip used to provide the advertisements;

monitoring a total quantity of targeted advertisements used to provide the advertisements;

determining whether the total quantity of targeted advertisements exceeds a threshold value that is based on the request to use the portion of the inventory for the advertisements associated with the advertiser; and in response to determining that the total quantity of targeted advertisements exceeds the threshold value, preventing the advertisements from being provided on subsequent trips, wherein the impression count is used to create a report ensuring a proof of contract fulfillment of an advertisement campaign with the advertiser, and wherein transmitting the instructions to the advertisement controller processing device on-board the vehicle comprises transmitting the advertisement, independent from the entertainment content, to the advertisement controller within a predetermined time of every trip.

* * * * *